United States Patent

Orthey et al.

[11] Patent Number: 5,170,559
[45] Date of Patent: Dec. 15, 1992

[54] ROSE-GRIPPING SHEARS

[75] Inventors: Gebhard Orthey, Nauroth; Helmut Riekel, Betzdorf, both of Fed. Rep. of Germany

[73] Assignee: Wolf-Gerate GmbH, Fed. Rep. of Germany

[21] Appl. No.: 656,043

[22] PCT Filed: Aug. 30, 1989

[86] PCT No.: PCT/EP89/01019
§ 371 Date: Feb. 14, 1991
§ 102(e) Date: Feb. 14, 1991

[87] PCT Pub. No.: WO90/01866
PCT Pub. Date: Mar. 8, 1990

[30] Foreign Application Priority Data

Aug. 31, 1988 [DE] Fed. Rep. of Germany ....... 3829577

[51] Int. Cl.$^5$ .............................. B26R 1/02; B26R 1/04
[52] U.S. Cl. ............................................ 30/134; 30/135
[58] Field of Search ............... 30/186, 187, 188, 189, 30/190, 191, 193, 134, 135

[56] References Cited

U.S. PATENT DOCUMENTS

| 1,458,878 | 6/1923 | Dexter | 30/134 |
| 1,775,086 | 9/1930 | Bonehill | 30/134 |
| 3,047,945 | 8/1962 | Logan | 30/134 |
| 3,336,667 | 8/1967 | Wallace et al. | 30/135 |
| 3,688,405 | 9/1972 | Dutra, Jr. | 30/135 |
| 3,762,048 | 10/1973 | Carter . | |
| 4,117,592 | 10/1978 | Mori et al. | 30/135 |
| 4,228,707 | 10/1980 | Arlett | 30/134 |

FOREIGN PATENT DOCUMENTS

| 1126184 | 3/1962 | Fed. Rep. of Germany . |
| 2601225 | 1/1988 | France . |
| 1473646 | 5/1977 | United Kingdom . |

Primary Examiner—Douglas D. Watts
Assistant Examiner—Paul M. Heyrana, Sr.
Attorney, Agent, or Firm—Ostrolenk, Faber, Gerb & Soffen

[57] ABSTRACT

A cutting blade (16) of rose-gripping shears cooperates with an anvil (30). A clamping piece (50), which has a clamping plate (52) which rests against the anvil (30) in the closed position, is movable together with the cutting blade (16). The said clamping piece can move backwards under spring action in order to hold a cut stem between the clamping plate (52) and the anvil (30). The spring urging of the clamping piece (50) is obtained by a spring arm (56) which extends in an arcuate section around the swivel pin (22) between the shear arms and comes against a mounting plate (58) which is connected, fixed for rotation, to the gripping lever of the cutting blade (16).

3 Claims, 2 Drawing Sheets

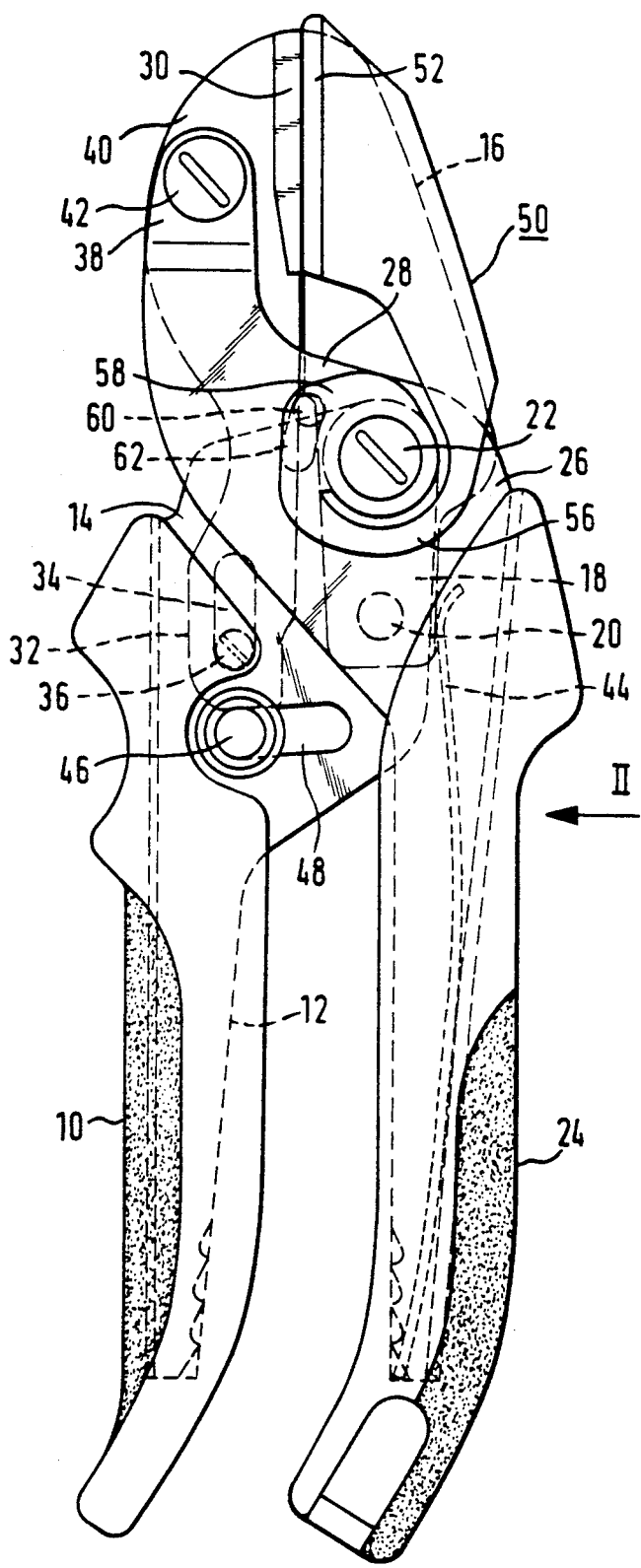
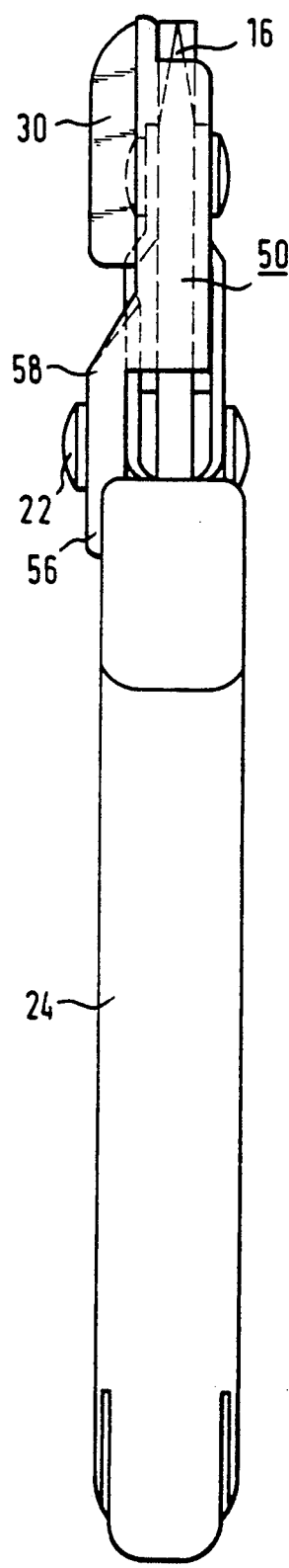

ROSE-GRIPPING SHEARS

The present invention relates to rose-gripping shears of the type including a cutting blade connected to a first handle, an anvil connected to a second handle which is pivotally connected to the first handle, and a clamping piece urged by spring action against the anvil. Said shears are marketed by the firm of Wolf-Geräte GmbH of Betzdorf under the name RS-PA. The automatic gripping mechanism formed by the clamping piece firmly holds the material which has been cut off, i.e. the stems which have just been cut, so that even stems having thorns can be cut without scratching one's hands.

In the known shears, the clamping piece is mounted for movement around the pivot pin of the arms of the shears and one end of a leaf spring is riveted to a lug which engages behind the cutting blade, the other end of the spring resting within the arm of the shears constituting the anvil. In this way, the clamping piece can move rearward with respect to the cutting blade and firmly hold stems which have been clamped together with the anvil. This automatic gripping system operates dependably and assures, with a progressive cut, a smooth, carefully cut surface.

The object of the present invention is to simplify the automatic gripping system of shears of this type and reduce the cost of manufacture thereof without the favorable automatic gripping system being impaired.

This object is achieved by a clamping piece formed by a resilient plastic part.

Due to the fact that the plastic part which forms the clamping piece is resilient, the additional leaf spring required in the known shears can be dispensed with. By suitable development of a spring arm which connects the clamping plate to a mounting plate, a specific spring characteristic can be obtained. The mounting of the clamping piece is extremely simple, since it can be placed on together with the pivot pin which connects the arms of the shears, and the mounting is obtained by means of a form-locked fixing in position of the mounting plate.

One embodiment of the invention will be described below with reference to the drawing, in which:

FIG. 1 is a view of the shears of the invention, shown in closed, locked condition;

FIG. 2 is a view of the shears seen in the direction indicated by the arrow II in FIG. 1;

Figure 3:
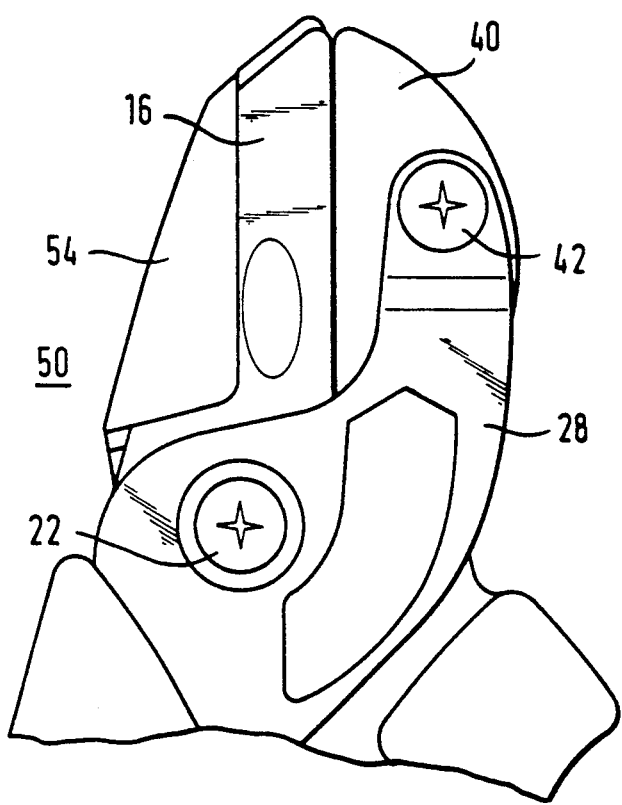
FIG. 3 is a rear view of the head part of the shears.

The shears have a first handle (10) of plastic which surrounds a metallic grip lever arm (12) which is of U-shaped cross section and continues upward into two mounting plates (14) which form the arms of the U-section and receive further parts of the shears between them. Between the two mounting plates there is inserted a first cutting blade (16), the bottom continuation (18) of which is fixed by means of a pin (20) in holes in the mounting plates (14). A pivot pin (22) represents the second point of connection between plates and cutting blade (16) so that the handle (10) is rigidly attached to the cutting blade (16).

A second handle (24) surrounds a second metal handle lever (26) which is of U-shaped cross section and continues in two mounting plates (28) which surround the mounting plates (14). The articulated connection of the mounting plates or handle levers is effected by the pivot pin (22). The second cutting blade, which is in the form of an anvil (30), has its bottom extension (32) guided for displacement between the plates (14) of the handle lever (12). The extension has a slot (34) into which there engages a pin (36) which is fixed between the two plates (14). The inwardly bent ends (38) surround the anvil bearing lever (40), and the connection being effected via a pivot pin (42). A restoring leaf spring (44) arranged within the second handle (24) has its upper movable end resting against the edge, located on the right in FIG. 1, of the plates (14) or cutting-blade extension (18), as a result of which the shears are urged into their open position. In their closed position, the shears can be locked by means of a slide pin (46) which is guided in slots (48) in the plates (14). In the locked position shown in FIG. 1, the lower end of the extension (32) of the anvil bearing lever (40) rests against the slide pin (46) and thus holds the shears in closed position against the force of the spring (44). When the slide pin (46) is pushed within the slot 48 into the right-hand end position shown in FIG. 1, the lower end (32) can slide past on the slide pin (46) and the shears can be actuated.

With the cutting blade (16) there is movable a clamping piece of elastic plastic which bears a clamping plate (52) which in closed position rests against the anvil (30) and together with the latter forms a holding clamp for stems which have been cut off. This plastic part (50) surrounds the cutting blade (16) from the rear and grips over the latter by means of a lug (54) (FIG. 3). At the bottom, the plastic part (50) is extended by a spring arm (56) which terminates in a mounting plate (58) which is provided with a hole through which the pivot pin (22) passes. The mounting plate (58) is provided with a pin (60) which is formed thereon and engages through an arcuate slot (62) of the upper plate (28) into a hole in the upper mounting plate (14), in this way connecting the mounting plate, fixed for rotation, to the first handle (10). In this way the result is obtained that the clamping piece (50) can be swung rearward with respect to the cutting blade (16), in which connection a clamping force is exerted on the clamping plate (52) via the spring arm (56). When the shears are closed, the clamping plate (52) can accordingly move backward under spring action with respect to the anvil (30) and together with the latter firmly clamp a stem which has just been cut off.

We claim:

1. Rose-gripping shears which comprises:
a first handle including a first gripping lever; a cutting blade having a cutting surface connected to the first handle; a second handle including a second gripping lever; an anvil which cooperates with the cutting surface of the cutting blade connected to the second handle; a first pin pivotably connecting the first and second handles such that the cutting blade is pivotably moveable with respect to the second handle; a resilient, plastic, clamping piece surrounding the cutting blade from the side thereof opposite the cutting surface and having a lug which grips the cutting blade, a spring arm which extends downwardly and a mounting plate connected to the spring arm; the mounting plate having a hole through which the first pin passes and having a second pin mounted thereon; and the first gripping lever having a hole for receiving the second pin so that the mounting plate is fixed, for rotation, to the first handle and moves around the first pin with the cutting blade.

2. Rose-gripping shears according to claim 1, wherein the spring arm is arcuately shaped and is curved around the first pin.

3. Rose-gripping shears according to claim 1, wherein the second gripping lever has an arcuate slot formed therein and the second pin passes through said arcuate slot.

* * * * *